(12) United States Patent
Crosby et al.

(10) Patent No.: US 10,391,717 B2
(45) Date of Patent: Aug. 27, 2019

(54) PACKAGE AND HEAT SEALING DEVICE

(71) Applicant: GlaxoSmithKline LLC, Wilmington, DE (US)

(72) Inventors: Jason R. Crosby, Sun Prairie, WI (US); Gautam Debnath, West Bengal (IN); Roger P. Fager, Mt. Horeb, WI (US); Peter R. Laubmeier, Mazomanie, WI (US); Curtis Emmanuel Stover, York, PA (US)

(73) Assignee: GlaxoSmithKline, LLC, Wilmington, DE (US)

( * ) Notice: Subject to any disclaimer, the term of this patent is extended or adjusted under 35 U.S.C. 154(b) by 247 days.

(21) Appl. No.: 15/506,819

(22) PCT Filed: Aug. 27, 2015

(86) PCT No.: PCT/US2015/047098
§ 371 (c)(1),
(2) Date: Feb. 27, 2017

(87) PCT Pub. No.: WO2016/033281
PCT Pub. Date: Mar. 3, 2016

(65) Prior Publication Data
US 2017/0266873 A1    Sep. 21, 2017

Related U.S. Application Data

(60) Provisional application No. 62/042,854, filed on Aug. 28, 2014.

(51) Int. Cl.
*B32B 37/00* (2006.01)
*B29C 65/18* (2006.01)
(Continued)

(52) U.S. Cl.
CPC .......... *B29C 65/18* (2013.01); *B29C 66/1312* (2013.01); *B29C 66/244* (2013.01);
(Continued)

(58) Field of Classification Search
CPC ... B29C 65/18; B29C 66/1312; B29C 66/244; B29C 66/301; B29C 66/549;
(Continued)

(56) References Cited

U.S. PATENT DOCUMENTS 3,166,462 A * 1/1965 Schoder ................. B65B 51/18
                                                    156/311
4,277,931 A    7/1981 Mahaffy et al.
(Continued)

FOREIGN PATENT DOCUMENTS

GB          2 433 913 A    7/2007
WO    WO 2013/134495 A1    9/2013
(Continued)

OTHER PUBLICATIONS

EP Supplemental Search Report dated Mar. 2, 2018.

*Primary Examiner* — James D Sells
(74) *Attorney, Agent, or Firm* — Joshua C. Sanders

(57) ABSTRACT

Aspects of the present invention are directed to a heat sealed packaging wherein the heat seal is along a curved surface. Additional aspects of the present invention are directed to a device for heat sealing a package on a surface that is curved along the direction of force.

8 Claims, 17 Drawing Sheets

(51) Int. Cl.
*B29C 65/00* (2006.01)
*B65D 43/16* (2006.01)
*B65B 51/10* (2006.01)
*B65B 7/26* (2006.01)
B65D 1/36 (2006.01)
B29L 31/00 (2006.01)

(52) U.S. Cl.
CPC .......... *B29C 66/301* (2013.01); *B29C 66/549* (2013.01); *B29C 66/81422* (2013.01); *B29C 66/81423* (2013.01); *B29C 66/81427* (2013.01); *B29C 66/81431* (2013.01); *B29C 66/81457* (2013.01); *B29C 66/81463* (2013.01); *B29C 66/832* (2013.01); *B29C 66/849* (2013.01); *B29C 66/8432* (2013.01); *B29C 66/92655* (2013.01); *B65B 7/26* (2013.01); *B65B 51/10* (2013.01); *B65D 43/162* (2013.01); *B29C 66/53462* (2013.01); *B29C 66/71* (2013.01); *B29L 2031/7162* (2013.01); *B29L 2031/7164* (2013.01); *B65D 1/36* (2013.01); *B65D 2543/00148* (2013.01); *B65D 2543/00425* (2013.01)

(58) Field of Classification Search
CPC ........ B29C 66/81422; B29C 66/81423; B29C 66/81427; B29C 66/81431; B29C 66/81457; B29C 66/81463; B29C 66/832; B29C 66/8432; B29C 66/849; B29C 66/92655; B65B 7/26; B65B 51/10; B45D 43/162
USPC ...................................... 156/583.1
See application file for complete search history.

(56) References Cited

U.S. PATENT DOCUMENTS

| | | | |
|---|---|---|---|
| 4,522,302 A | 6/1985 | Paikoff | |
| 5,031,383 A | 7/1991 | Hustad | |
| 5,331,791 A * | 7/1994 | Fux | B65B 61/18 53/373.7 |
| 8,105,638 B2 * | 1/2012 | Harlfinger | B65D 43/0206 426/106 |
| 2008/0295455 A1 | 12/2008 | Bellamah | |
| 2009/0007523 A1 | 1/2009 | Alipour et al. | |

FOREIGN PATENT DOCUMENTS

WO  WO 2014/042025 A1  3/2014
WO  WO 2014/069732     5/2014

* cited by examiner

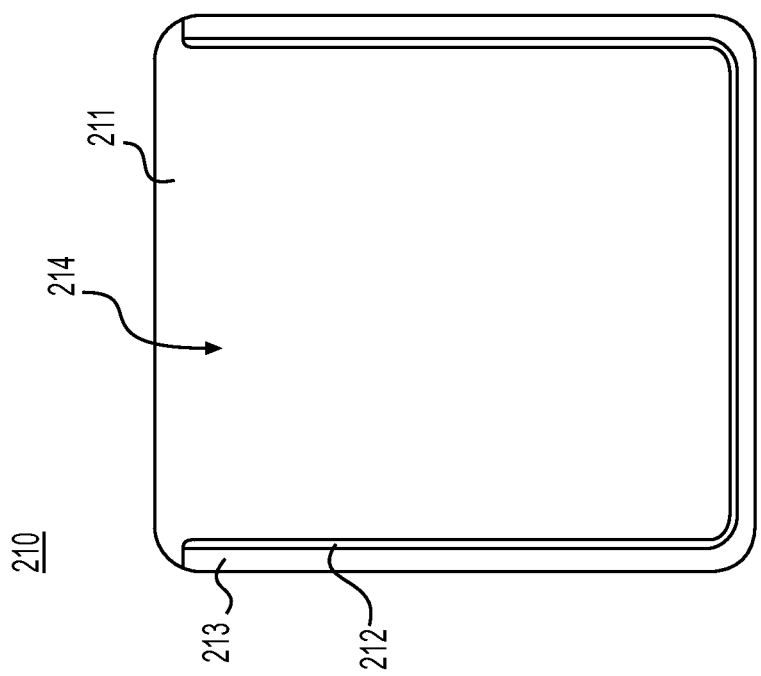
FIG. 14
FIG. 13

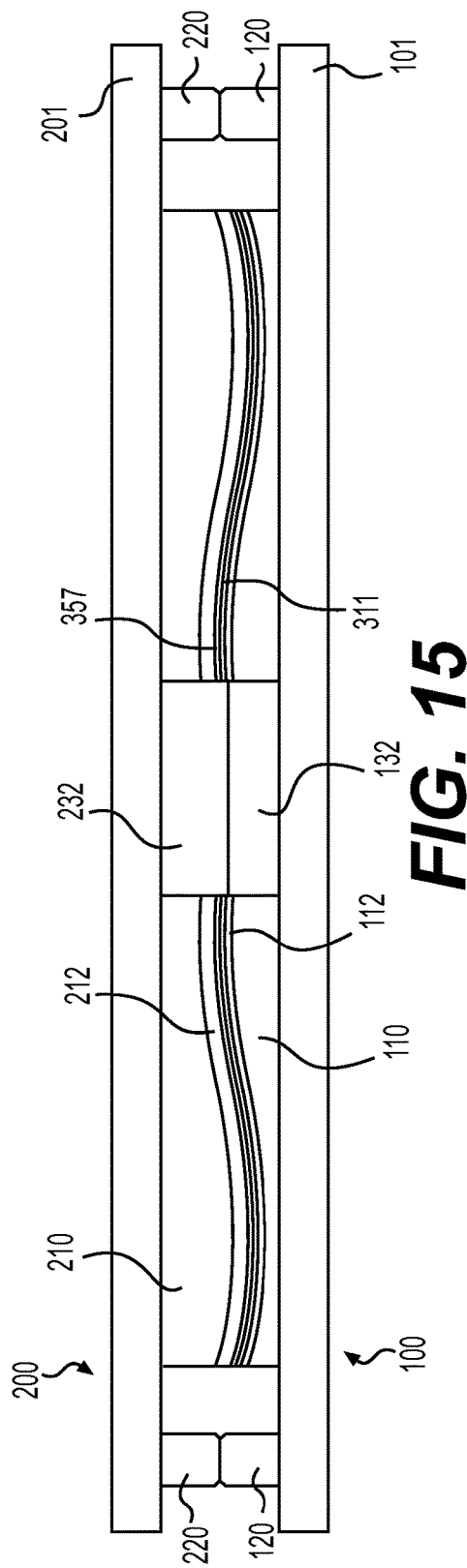
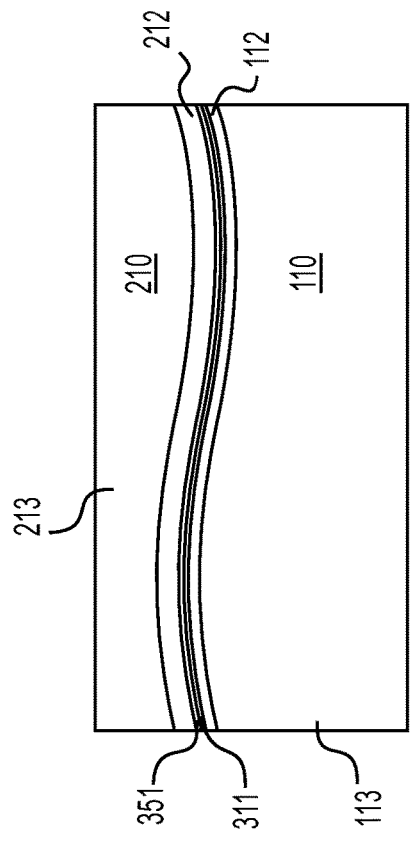

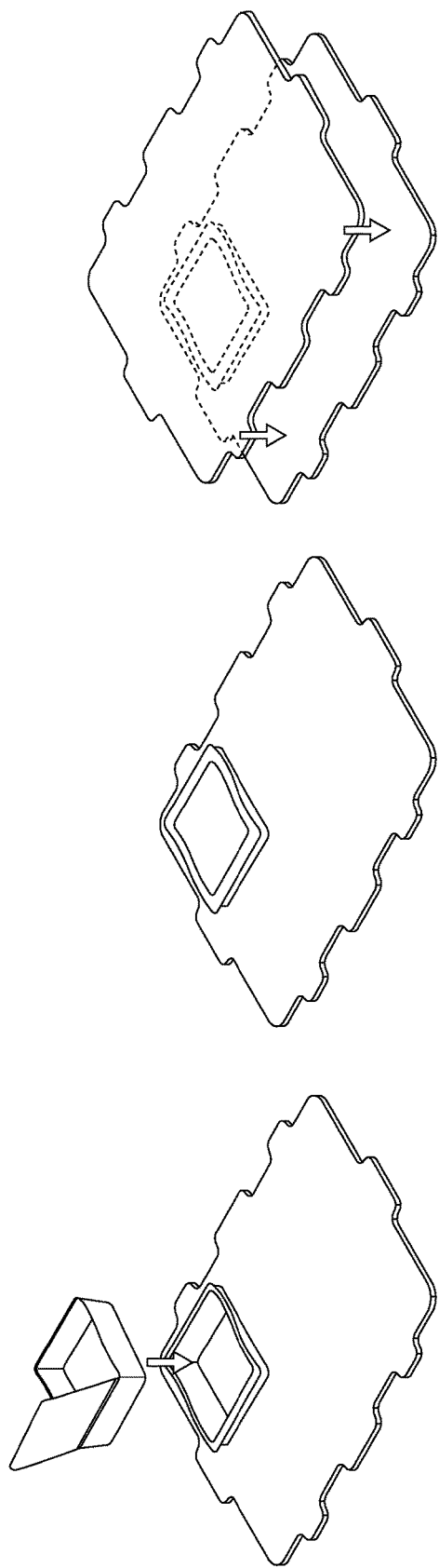
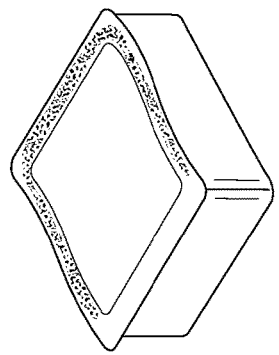
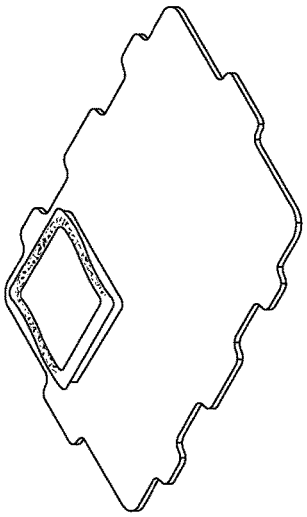
FIG. 17A  FIG. 17B  FIG. 17C  FIG. 17D  FIG. 17E

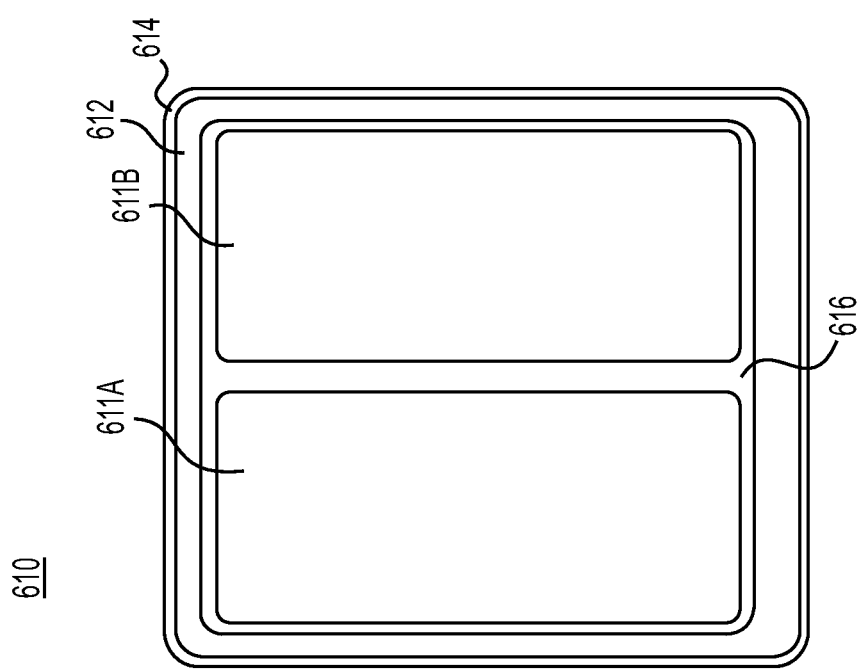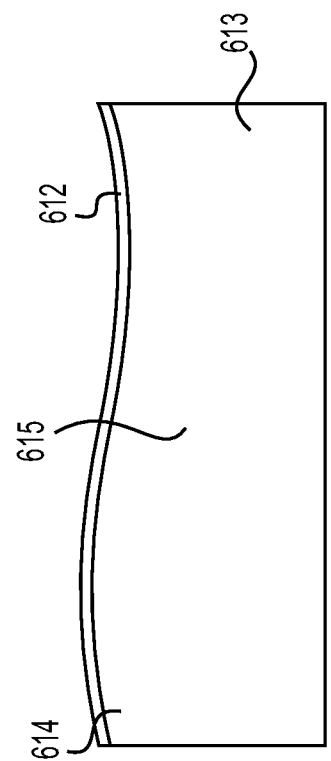

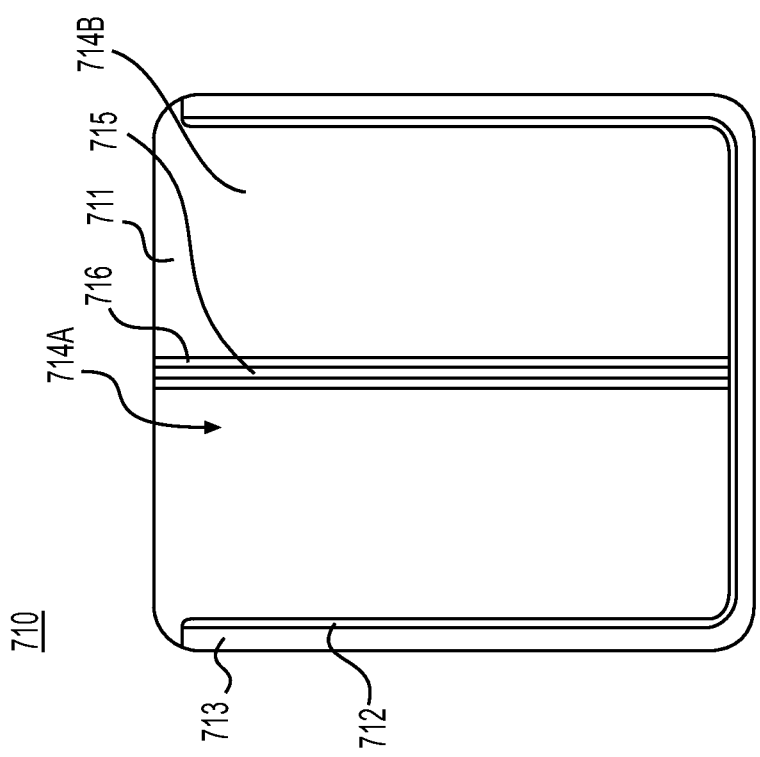
FIG. 24
FIG. 23

PACKAGE AND HEAT SEALING DEVICE

This application is a 371 of International Application No. PCT/US2015/047098, filed Aug. 27, 2015, which claims the benefit of U.S. Application 62/042,854 filed Aug. 28, 2014.

TECHNOLOGY FIELD

Aspects of the present invention are directed to a heat sealed package and device for heat sealing a package, and in particular, a package heat sealed along a non planer surface and a device for providing a heat seal on a curved surface.

BACKGROUND

Tamper resistant packaging is a high priority for many consumer product companies, and, in particular, consumer healthcare product companies where the contents of the package may be dangerous if contaminated prior to purchasing or if consumed by a minor without the supervision of an adult. Traditionally, heat sealed packaging has been known to be a very secure and tamper resistant format.

A clamshell is a one-piece container consisting of two halves joined by a hinge area which allows the structure to come together to close. Clamshells are often made of a shaped plastic material, in a way that is similar to a blister pack. Clamshell containers can be made of a variety of plastics such as polystyrene, polyester, PVC, among others. The material can be made by thermoforming or can be injection molded into the desired shapes. A single piece of material is used for the top and bottom with a "living hinge" that is integral with the material, rather than added separately. Clamshells can use a variety of means of closing or sealing. Some have self-locking tabs, snaps, or have a friction fit. Others use adhesive, pressure-sensitive tape, labels, staples, or are heat sealed, rf sealed, or ultrasonic sealed.

Heat sealing is the process of sealing one thermoplastic to another similar thermoplastic using heat and pressure. The direct contact method of heat sealing utilizes a constantly heated die or sealing bar to apply heat to a specific contact area or path to seal or weld the thermoplastics together.

The concept of heat sealing is well known in the art. Traditionally, heat sealing has required that the surfaces to be sealed be linear about the directional force (i.e. a flat surface). This provides limitations to the use of heat sealing on packaging that is more contoured and appealing to the consumer. For such complex packaging, other sealing methods are required that may not provide the tamper resistance and security that heat sealing provides, thus resulting in a conundrum for a company seeking high tamper resistance while also seeking appealing packaging to consumer. Thus, technology allowing for heat sealing on a undulating or curved surface is highly desirable.

SUMMARY

Aspects of the present invention are related to a device for heat sealing a package comprising: a support boss plate having a boss. The boss has a face with one more cavities for receiving a package and one or more gaskets secured to the face and surrounding at least a portion of the one or more cavities. The gaskets and at least the portion of the face on which the one or more gaskets is secured is non-flat. The device further includes a heater plate having a heater with a face and one or more heating flanges mateable with the one or more gaskets on the support boss. The heating flanges are be non-flat. Upon mating of the support boss with the heater and an application of a downward directional force and heat, a package may be sealed with a non-linear seal along the downward directional force.

The support boss plate and the heater plate may further shut height bosses for optimizing the distance between the support boss and the heater when the support boss and heater are mated. The one or more gaskets may have a width of between about 0.05 mm and about 0.5 mm, or between about 0.125 mm and about 0.25 mm. The one or more heating flangse may have a width of 0.05 mm and about 0.5 mm, or about 0.125 mm and about 0.25 mm.

In certain embodiments, the support boss plate and the heater boss plate comprise multiple bosses and multiple heaters corresponding to the multiple bosses. The multiple bosses may be independently adjustable about the x, y, and z axis.

An additional aspect of the present invention is related to a package for holding a product comprising: a first side having an optional first recessed area and a first perimeter edge wherein at least a portion of the first perimeter edge is curved and a second side having a second recessed area and a second perimeter edge wherein at least a portion of the second perimeter edge is curved. The first side and the second side are heat sealed together along at least a portion of the first perimeter edge and at least a portion of the second perimeter edge.

The package may be comprised of PET-G, PVC, or polystyrene. In certain embodiments, the packaged is comprised of PET-G. The package may further comprise a consumer product within the package, such as, for example, a consumer healthcare product.

In another embodiment, the package for holding a product further comprises an interior wall curved out of plane and wherein the second side further comprises an interior wall curved out of plane, wherein the interior walls are heat sealed together to form at least two compartments.

BRIEF DESCRIPTION OF DRAWINGS

FIG. 13 shows a top view of an exemplary individual heater;

FIG. 14 shows a side view of an exemplary individual heater;

FIG. 15 shows a side view of an exemplary support boss plate and an exemplary heater plate during sealing;

FIG. 16 shows a side view of an exemplary individual heater and an exemplary support boss during sealing;

FIG. 17 shows an exemplary process for heat sealing a packaging;

FIG. 21 shows a top view of an exemplary individual support boss for sealing a package having multiple compartments;

FIG. 22 shows a side view of an exemplary individual support boss for sealing a package having multiple compartments;

FIG. 23 shows a top view of an exemplary individual heater for sealing a package having multiple compartments;

FIG. 24 shows a side view of an exemplary individual heater for sealing a package having multiple compartments.

DETAILED DESCRIPTION

Aspects of the present invention are directed to a package having a first side with an optional recessed portion and a perimeter edge and a second side with a recessed portion and a perimeter edge wherein at least a portion of the seal surface of each side is non planer. The package is sealed by heat sealing at least a portion of the each of the perimeter edges together. The ability to heat seal non planer edges of a package provides for the ability to provide a highly tamper resistant package that is also a complex design and visually appealing to consumers.

In some embodiments, the package may include one side that does not include a recessed portion, i.e., a flat surface, that is can be heat sealed to a side with a recessed portion to form an enclosed package. In some embodiments, the package may be a clamshell package, i.e., the first side and second side joined by an integral hinge.

The package may be comprised of one or a combination of any material suitable for heat sealing. Sutiable materials may be, for example, polystyrene, polyester, polyvinylchloride (PVC), polyethylene terephthalate (PET), or polyethylene terephthalate glycol-modified (PET-G). In a particular embodiment, the material may be PET-G, PVC, or more particularly, the material may be PET-G. In some embodiments, the first side and the second side of the package may be comprised of the same material. In other embodiments, the first side and second side may be comprised of different materials.

The package may contain various products, such as for example consumer products or more particularly consumer healthcare products. Exemplary consumer healthcare products include dermatological products, weight loss products, oral healthcare products, cold and flu products, respiratory products, analgesics, vitamins and minerals, gastrointestinal products, nicotine replacement therapy products, nutritional products, and pain relief products, among others.

To provide the most visual appeal to the consumer, the region of the package that is heat sealed is minimally noticeable to the consumer. As such a narrow heat seal is preferred, such as, for example a heat seal having a width of between about 1 mm and about 20 mm, more preferably between about 3 mm and about 6 mm. A narrow heat seal also provides for the edge of the package to be as small as possible, allowing for the package to "stand alone" on a display shelf.

Figure 1:
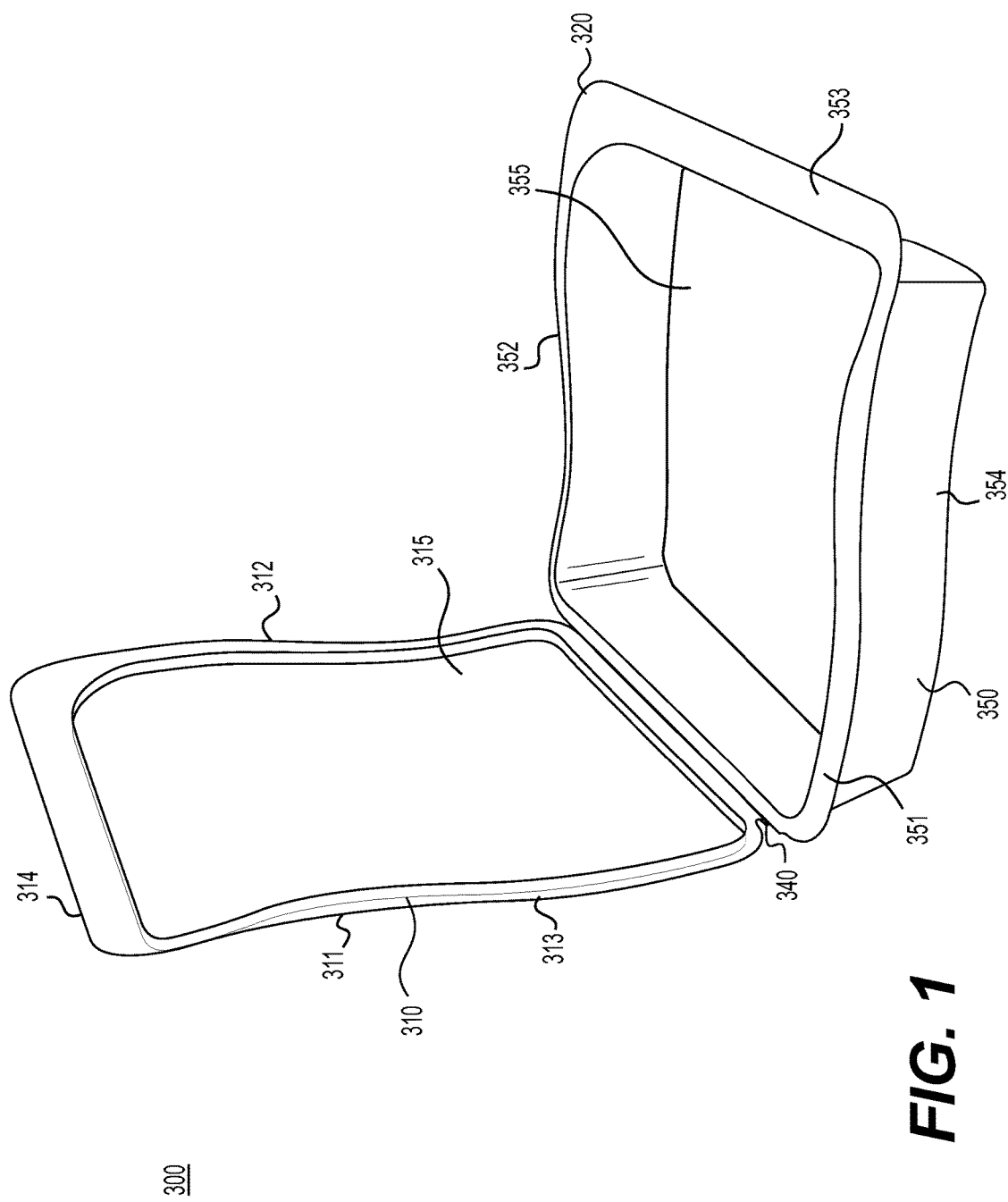
FIG. 1 shows a perspective view of an exemplary package prior to heat sealing.

FIG. 1 shows a perspective view of an exemplary package 300 prior to sealing. Package 300 includes first side 310 and second side 350. First side 310 includes top 311, recessed portion, 315, first side first curved side edge 312, first side second curved side edge 313, and first side front edge 314. Second side 350 includes second side first curved side edge 351, second side second curved side edge 352, second side front edge 353, second side wall 354 and second side cavity 355. First side 310 and second side 350 are connected at integral hinge 340.

Figure 2:
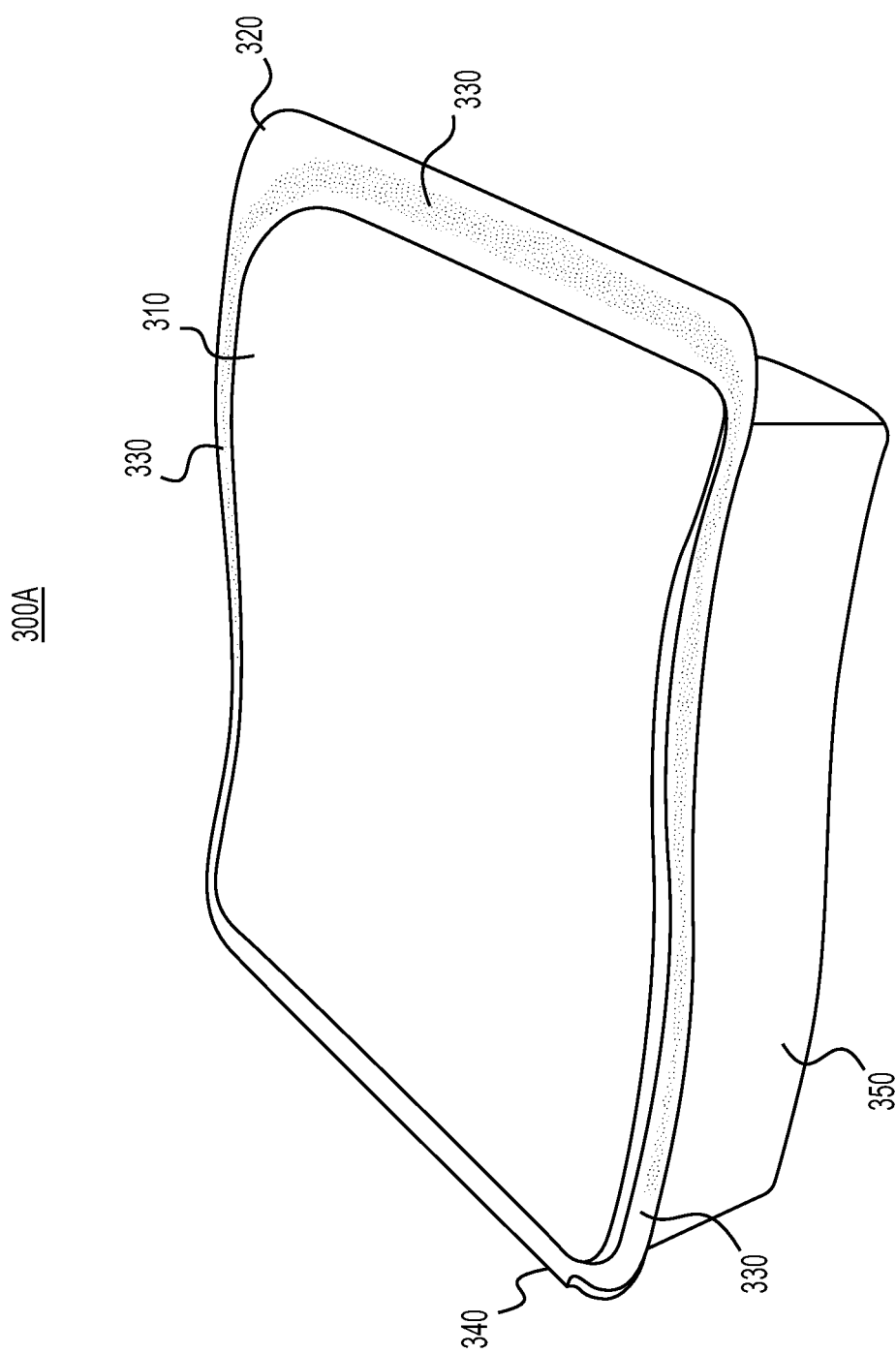
FIG. 2 shows a perspective view of an exemplary heat sealed package of the present invention.
Figure 3:
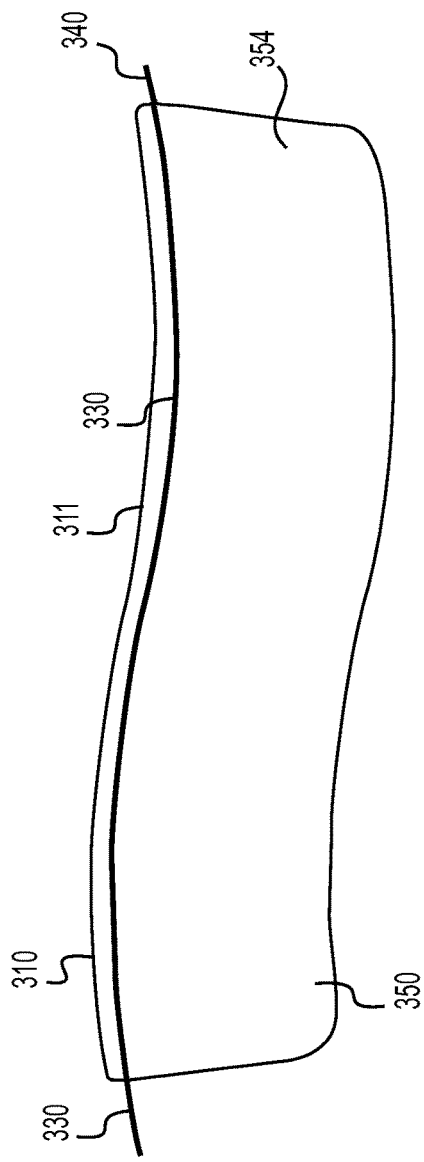
FIG. 3 shows a right side view of an exemplary heat sealed package of the present invention.
Figure 4:
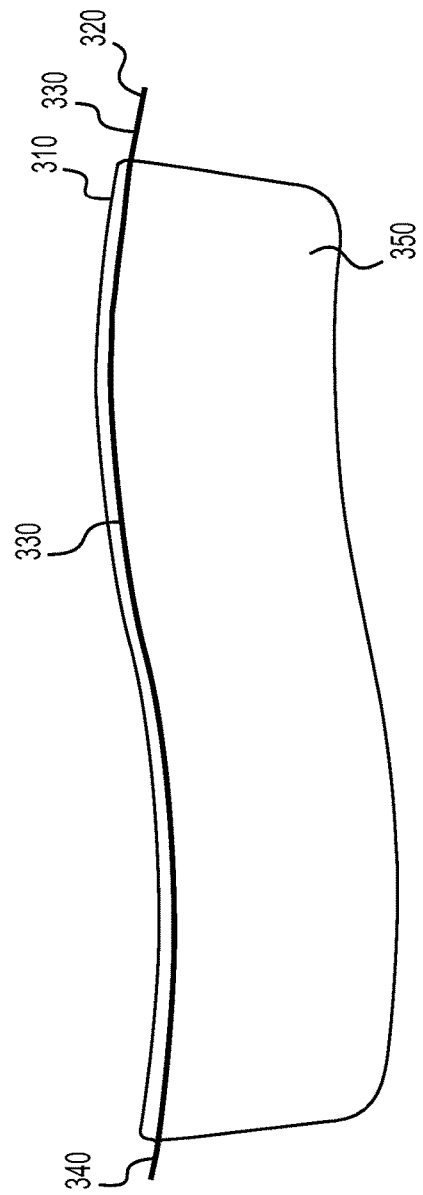
FIG. 4 shows a left side view of an exemplary heat sealed package of the present invention.

FIG. 2 shows a perspective view of an exemplary package 300A that has been heat sealed. First side first curved side edge 312 and second side first curved side edge 351 have been sealed at heat seal 330. First side second curved side edge 313 and second side second curved side edge 352 have been sealed at heat seal 330. First side front edge 314 and second side front edge 353 have also been sealed at heat seal 330.

Aspects of the present invention are directed to a device for heat sealing a package wherein the heat sealing is performed on a surface curved along the downward directional force of the heat sealing device. Heat sealing in such a manner provides for the heat sealing of more intricate and appealing packages while also providing a highly tamper resistant package. A device of the present invention includes a support boss plate and a heater plate. These plates may be attached to machinery generally known by those skilled in the art for heat sealing packages.

Figure 5:
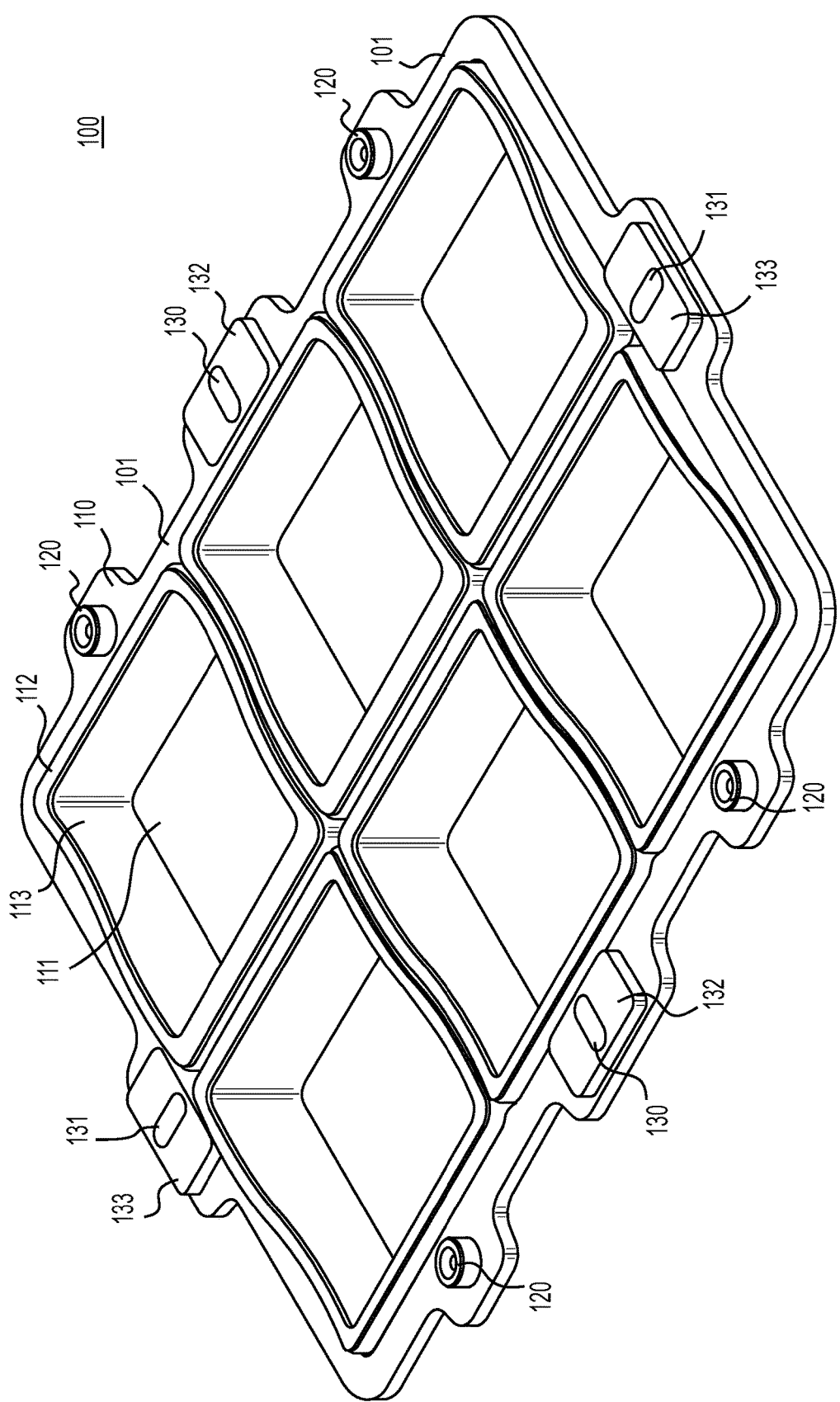
FIG. 5 shows a perspective view of an exemplary support boss plate.
Figure 6:
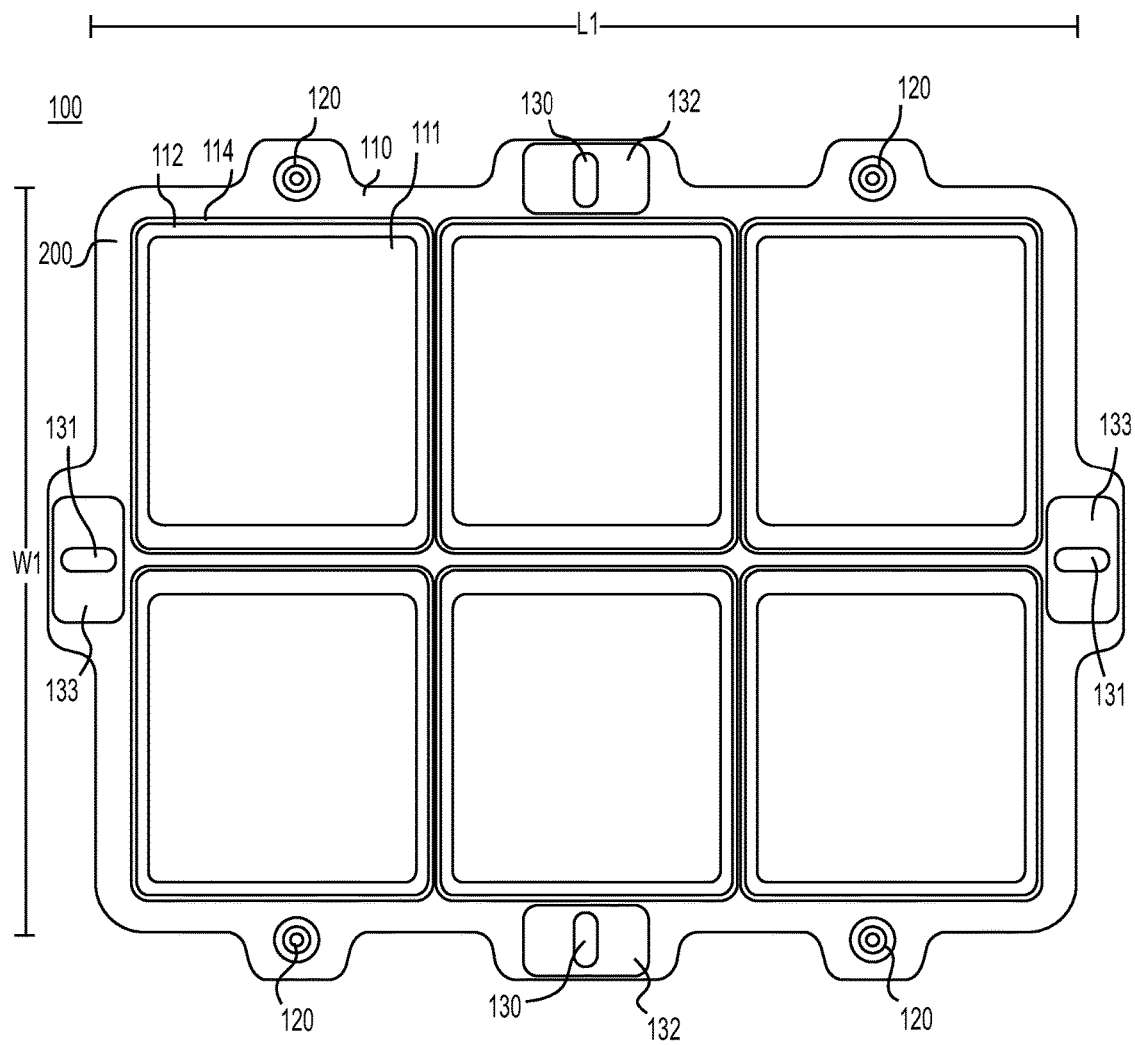
FIG. 6 shows a top view of an exemplary support boss plate.
Figure 7:
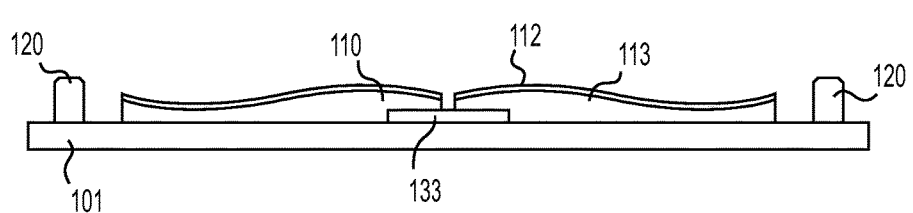
FIG. 7 shows a side view of an exemplary support boss plate.

An exemplary support boss plate 100 is shown in FIGS. 5, 6, and 7. Support boss plate 100 includes support plate 101 into which individual bosses 110 are located. Bosses 110 are adjustable along the X, Y, and Z axis to allow for proper alignment with heater plate 200. Support boss plate 100 has length L1 and width W1. Length L1 side includes shut height bosses 120 for optimizing the space between support boss 110 and heaters 210. Length L1 side includes fastener 132 with hole 130 for mating with a corresponding faster on heater plate 200. Width W1 side includes faster 133 with hole 131 for mating with corresponding fastener on heater plate 200.

Figure 9:
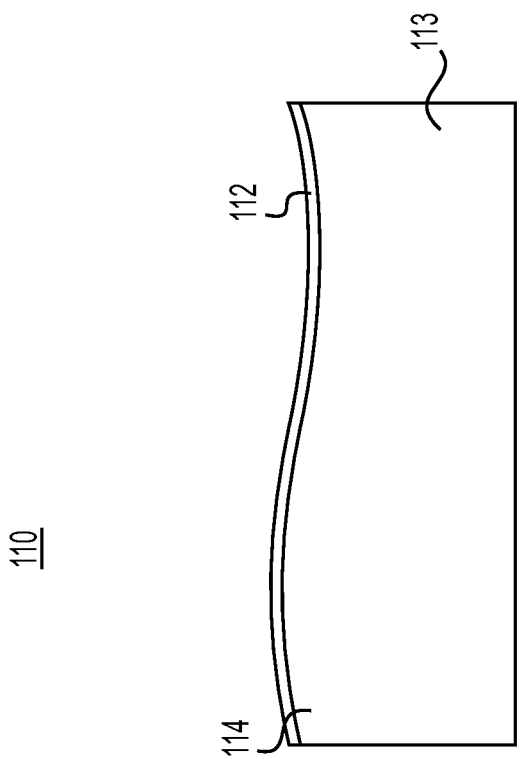
FIG. 9 shows a side view of an exemplary individual support boss.
Figure 8:
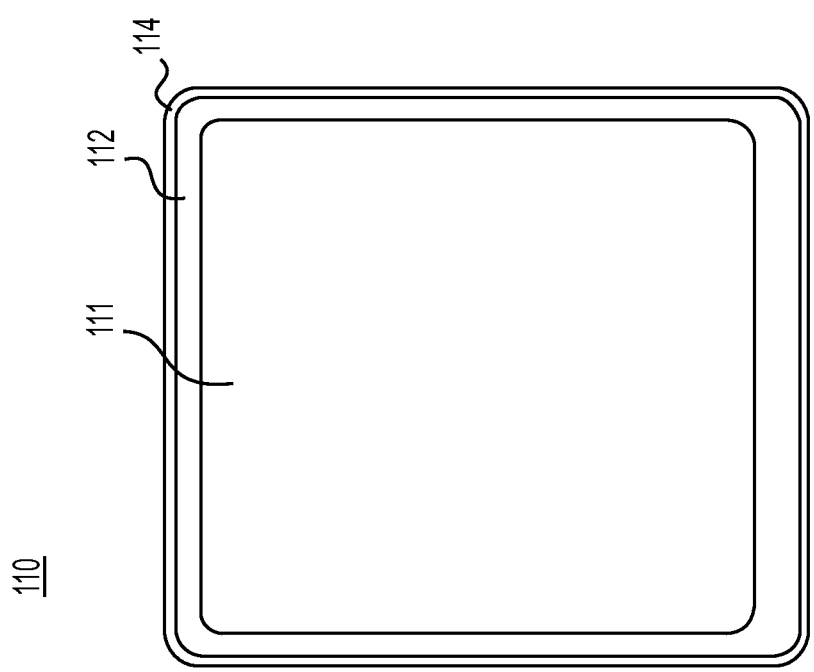
FIG. 8 shows a top view of an exemplary individual support boss.

An exemplary individual support boss is shown in FIGS. 8 and 9. Boss 110 includes perimeter wall 113, cavity 111 for receiving a side of a package and gasket 112 about perimeter wall top 114.

Figure 10:
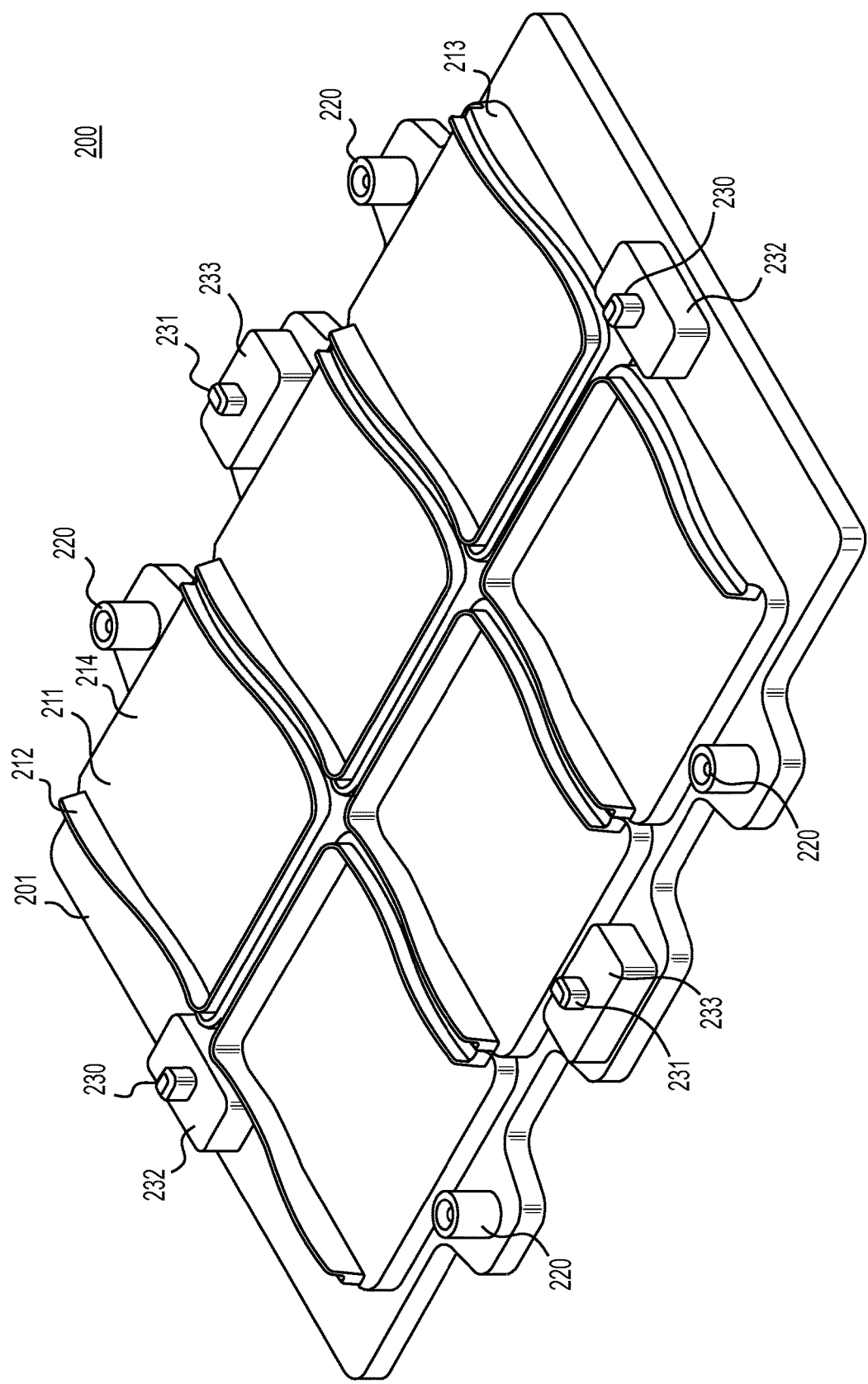
FIG. 10 shows a perspective view of an exemplary heater plate.
Figure 11:
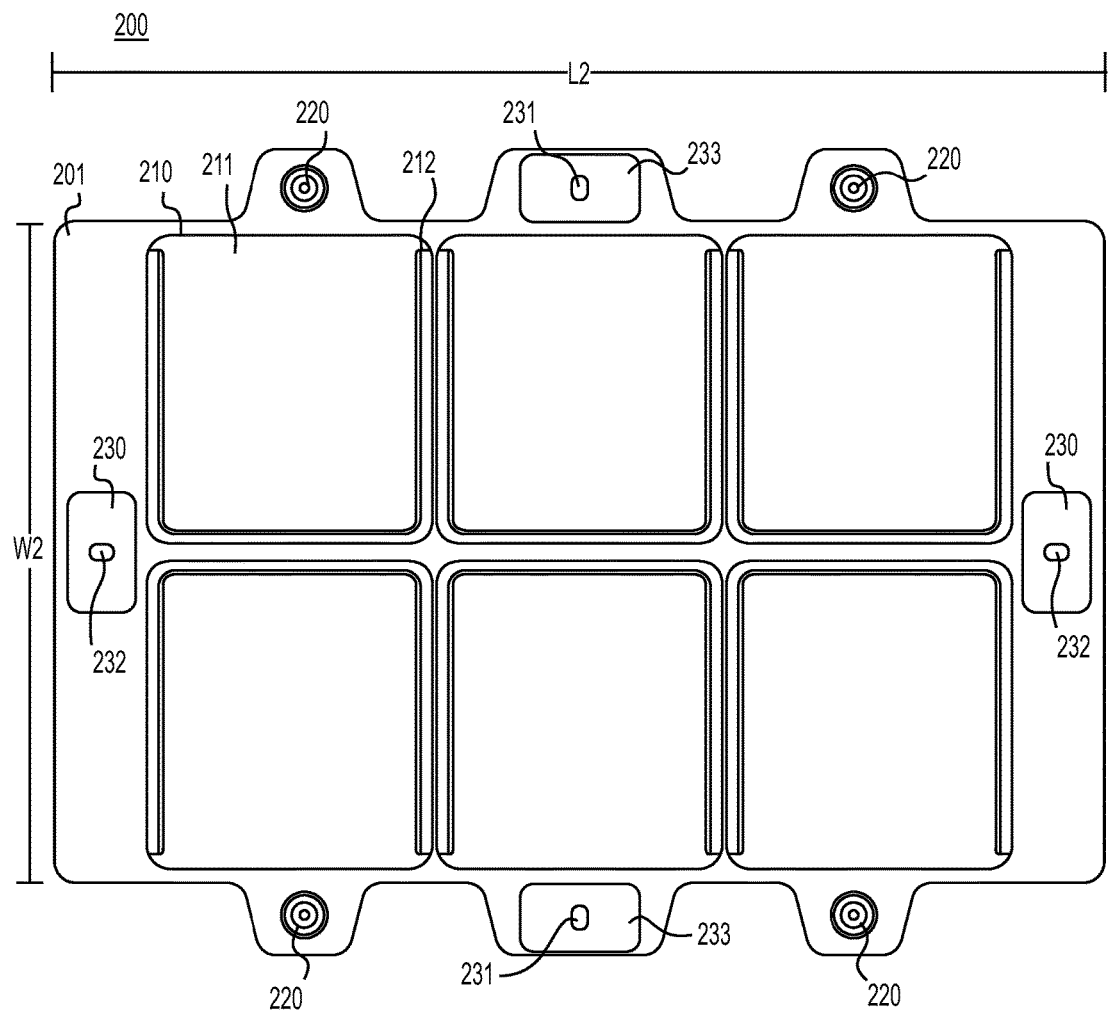
FIG. 11 shows a top view of an exemplary heater plate.
Figure 12:
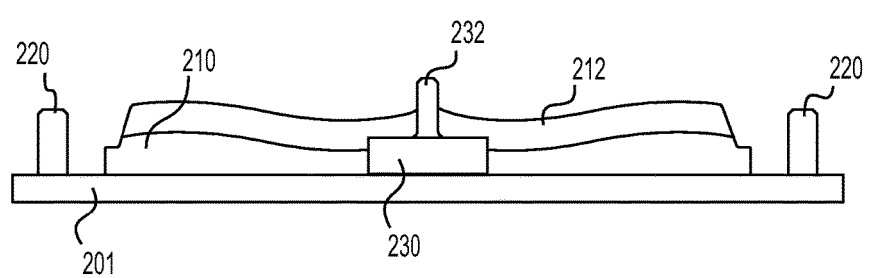
FIG. 12 shows a side view of an exemplary heater plate.

An exemplary heater plate is shown in FIGS. 10, 11, and 12. Heater plate 200 includes mounting plate 201 onto which individual heaters 210 are located. Heater plate 200 has length L2 and width W2. Length L2 side includes shut height bosses 220 corresponding to support boss plate 100 shut bosses 120 for optimizing the space between bosses 110 and heaters 210. Length L2 side includes fastener 232 with post 231 for mating with a corresponding fastener 132 with hole 131 on support boss plate 100. Width W2 side includes fastener 232 with post 230 for mating with corresponding fastener 133 and hole 131 on support boss plate 100.

An exemplary individual heater is shown in FIGS. 13 and 14. Heater 210 includes base 211, side wall 213 defining cavity 214. Heater flange 212 surrounds at least a portion of base 211 and is on top of side wall 213.

FIG. 15 shows a side view of support boss plate 100 and heater plate 200 in contact during the heat sealing process.

Corresponding shut bosses 120 and 220 are in contact with each other. Support boss plate 100 and heater plate 200 are secured by fasteners 133 and 232. First side second curved edge 311 and second side second curved edge 351 are in contact with each other through the application of pressure and heat from flange 212 of heater 200 and gasket 112 of boss. Upon the application of pressure and heat, first side second curved edge 311 and second side second curved edge 351 will be heat sealed 330. FIG. 16 shows a side view of an individual boss 110 and heater 210 during sealing first side second curved edge 311 and second side second curved edge 351 through the application of pressure and heat from flange 212 of heater 200 and gasket 112 of boss.

One skilled in the art would understand that the support boss plates and heater plates of the present invention may be attached to machinery for providing heat to the heater plate and moving the plates together to seal packages at suitable pressures.

Aspects of the present invention are also directed to heat sealed packages wherein the heat seal is applied to a curved peripheral edge as well as a curved interior surface. In some embodiments the heat sealed interior surface may act to divide the packaging into multiple compartments. These multiple compartments may contain multiple products. The products may be the same product, or different products, such as for example, complimentary products that may be used together.

Figure 18:
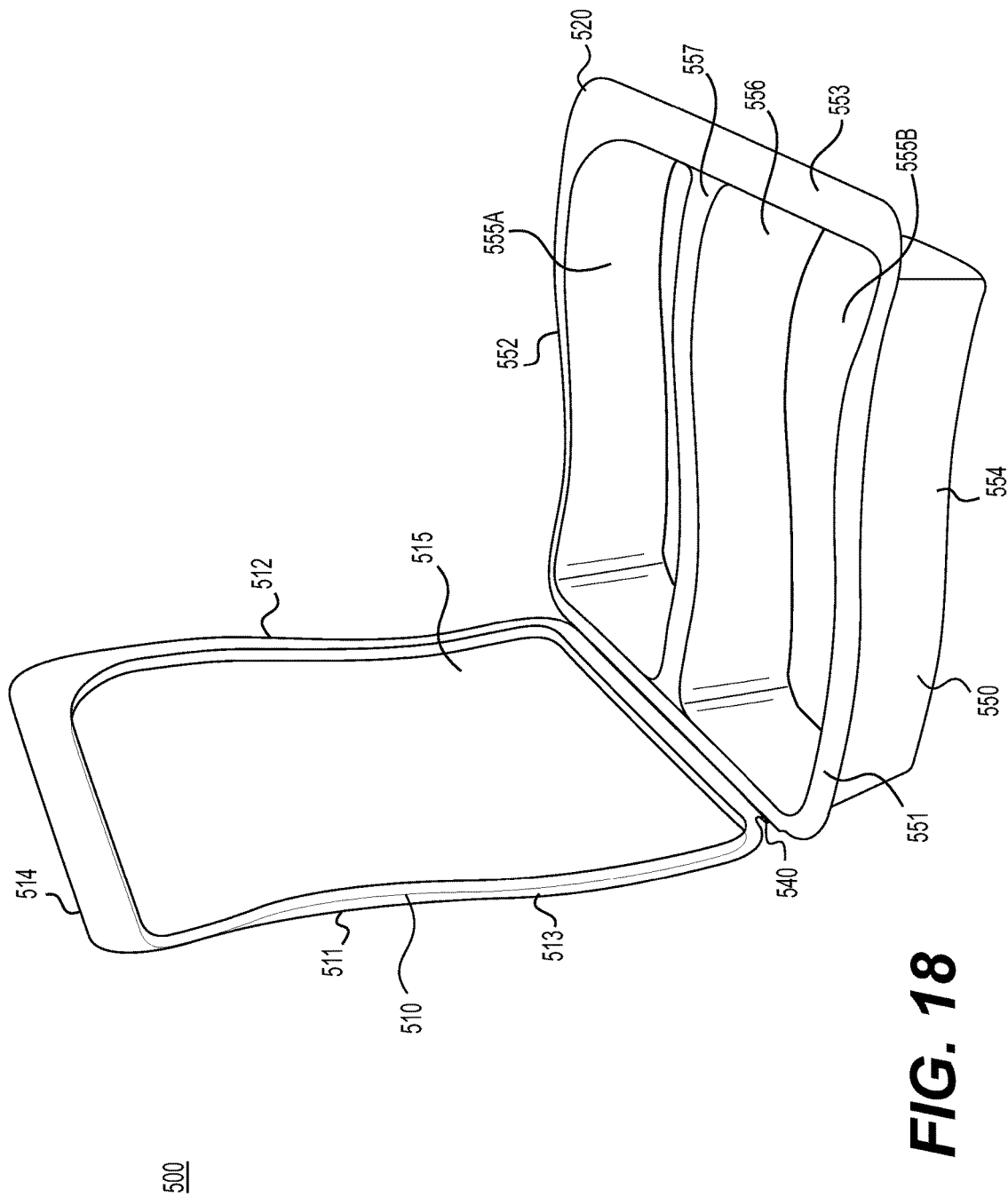
FIG. 18 shows a perspective view of an exemplary package having multiple compartments prior to heat sealing.

FIG. 18 shows a perspective view of an exemplary package 500 prior to sealing. Package 500 includes first side 510 and second side 550. First side 510 includes top 511, recessed portion, 315, first curved side edge 512, second curved side edge 513, and front edge 514. Second side 550 includes first curved side edge 551, second curved side edge 552, front edge 553, second side wall 554, interior curved wall 556 with interior curved wall edge 557, and 2 second second side cavities 555A and 555B. First side 510 and second side 550 are connected at integral hinge 540.

Figure 19:
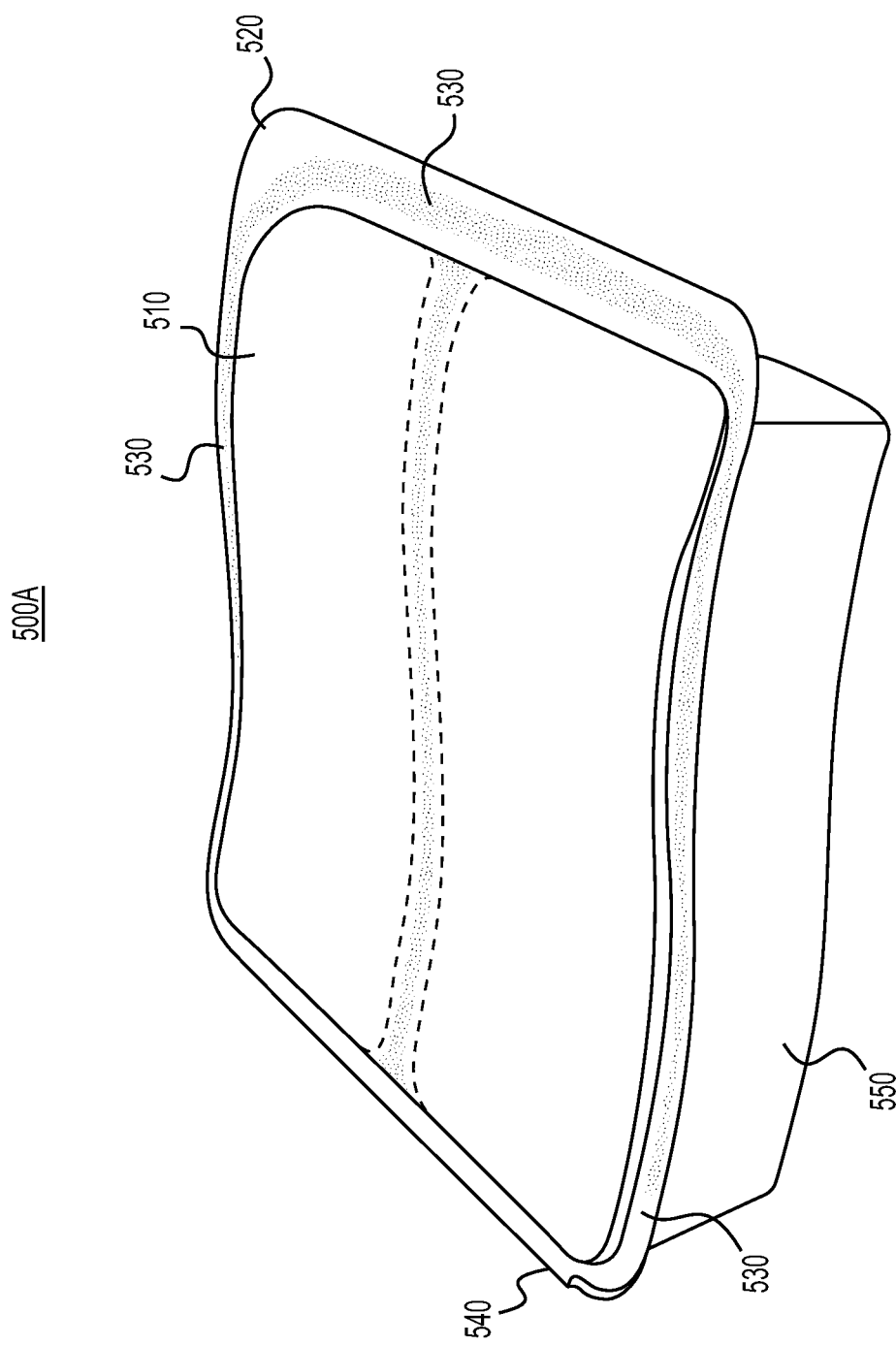
FIG. 19 shows a perspective view of an exemplary heat sealed package having multiple compartments.
Figure 20:
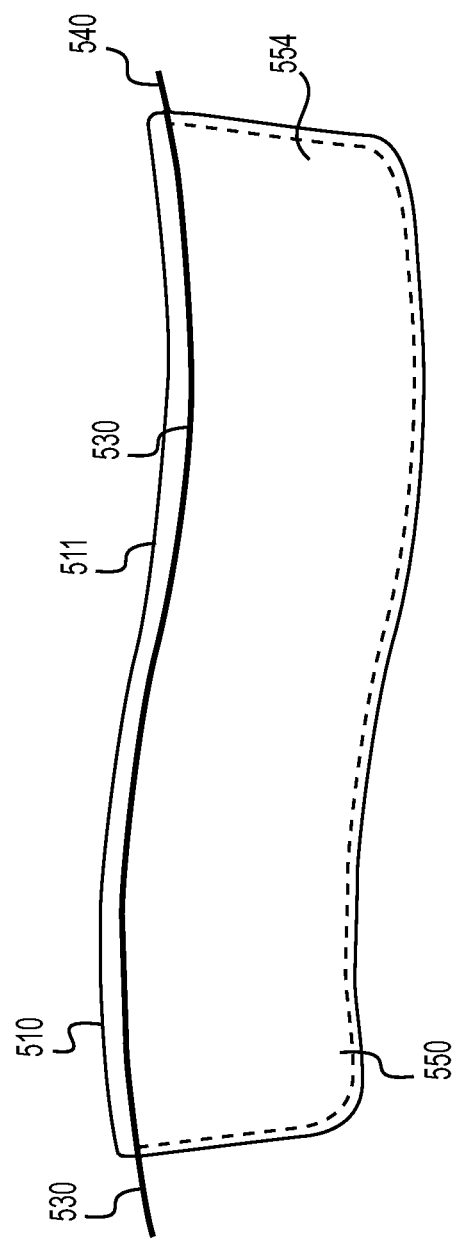
FIG. 20 shows a side view of an exemplary heat sealed package having multiple compartments.

FIG. 19 shows a perspective view of an exemplary package 500A that has been heat sealed. First side first curved side edge 512 and second side first curved side edge 551 have been sealed at heat seal 530. First side second curved side edge 513 and second side second curved side edge 552 have been sealed at heat seal 530. First side front edge 514 and second side front edge 553 have also been sealed at heat seal 530. First side top 510 has also been heat sealed to interior curved wall edge 557.

An exemplary individual support boss is shown in FIGS. 21 and 22. Boss 610 includes perimeter wall 613, cavities 611A and 611B separated by boss interior curved wall 615 with boss interior curved wall gasket 616 for receiving a side of a package and gasket 612 about perimeter wall top 614.

An exemplary individual heater is shown in FIGS. 23 and 24. Heater 710 includes base 711, side wall 713 defining cavities 714A and 714B. Heater flange 712 surrounds at least a portion of base 711 and is on top of side wall 713. Curved interior heater flange 715 at least partially separates cavities 714A and 714B and rests on top of curved interior heater wall 716.

Figure 25:
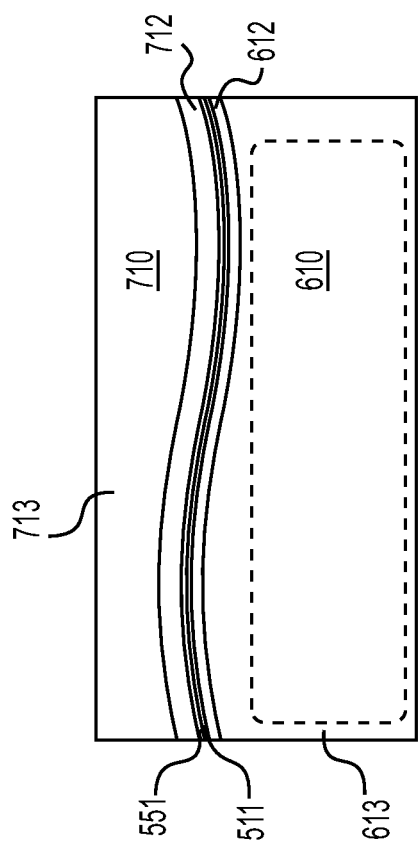
FIG. 25 shows a side view of an exemplary individual heater and an exemplary support boss during sealing a package having multiple compartments.

FIG. 25 shows a side view of an individual boss 610 and heater 710 during sealing first side second curved edge 511 and second side second curved edge 551 through the application of pressure and heat from flange 712 of heater 700 and gasket 612 of boss.

Suitable temperatures applied to the surface to be heat sealed may be between about 390° F. and about 500° F., or between about 415° F. and about 450° F.

Suitable pressure applied to the surface to be heat sealed may be between about 40 psi and about 110 psi, or between about 80 psi and about 100 psi.

An additional aspect of the present invention is directed to a method of heat sealing a package. FIG. 17 shows an exemplary process for heat sealing a package. A package as described herein may be placed into a cavity of a boss as described herein (FIG. 17A). The package may be closed (FIG. 17B). The heater may then be lowered onto the boss, and a heat and pressure may be applied to the edge of the package (FIG. 17C) to form a heat seal. Suitable temperatures and pressures are disclosed herein. The heater may be removed (FIG. 17D) and the sealed packaged removed from the boss (FIG. 17E).

What is claimed is:
1. A device for heat sealing a package comprising:
a support boss plate having a boss with a face with one or more cavities for receiving a package and one or more gaskets secured to the face and surrounding at least a portion of the one or more cavities, wherein the gasket and at least the portion of the face on which the one or more gaskets is secured is non-flat, and
a heater plate having a heater with a face and one or more heating flanges mateable with the one or more gaskets on the support boss, wherein the one or more heating flanges are non-flat;
wherein upon mating of the support boss with the heater and an application of a downward directional force and heat, a package may be sealed with a non-linear seal along the downward directional force.
2. The device of claim 1, wherein the support boss plate and the heater plate further include shut height bosses for optimizing the distance between the support boss and the heater when the support boss and heater are mated.
3. The device of claim 1, wherein the one or more gaskets has a width of between about 0.05 mm and about 0.5 mm.
4. The device of claim 1, wherein the one or more gaskets has a width of between about 0.125 mm and about 0.25 mm.
5. The device of claim 1, wherein the one or more heating flanges has a width of 0.05 mm and about 0.5 mm.
6. The device of claim 5, wherein the one or more heating flanges has a width of about 0.125 mm and about 0.25 mm.
7. The device of claim 1, wherein the support boss plate and the heater boss plate comprise multiple bosses and multiple heaters corresponding to the multiple bosses.
8. The device of claim 7, wherein the multiple bosses are independently adjustable about the x, y, and z axis.

* * * * *